United States Patent [19]
Thompson et al.

[11] 3,781,461
[45] Dec. 25, 1973

[54] CABLE SPLICE ASSEMBLY AND METHOD

[76] Inventors: John T. Thompson, 244 Loring St., Los Angeles, Calif. 90024; George W. Gillemot, 2331 20th St., Santa Monica, Calif. 90405

[22] Filed: Mar. 30, 1972

[21] Appl. No.: 239,522

Related U.S. Application Data

[63] Continuation-in-part of Ser. No. 76,758, Sept. 30, 1970, abandoned.

[52] U.S. Cl. ................... 174/93, 174/76, 174/92
[51] Int. Cl. ........................................ H02g 15/18
[58] Field of Search ............... 174/92, 93, 78, 76, 174/88 F, DIG. 11

[56] References Cited
UNITED STATES PATENTS

| | | | |
|---|---|---|---|
| 3,040,121 | 6/1962 | Gillemot | 174/DIG. 11 |
| 2,923,762 | 2/1960 | Falkenstein | 174/92 |
| 3,518,358 | 6/1970 | Brown | 174/93 X |
| 2,938,940 | 5/1960 | Calendine et al. | 174/76 |
| 3,359,363 | 12/1967 | Oakman | 174/76 X |
| 3,499,972 | 3/1970 | Smith | 174/93 X |
| 3,209,067 | 9/1965 | Channel et al. | 174/93 |

Primary Examiner—Bernard A. Gilheany
Assistant Examiner—D. A. Tone
Attorney—William Douglas Sellers et al.

[57] ABSTRACT

A versatile, readily expandable cable splice assembly and method utilizing a high strength conductive member to interconnect the electrical shields of the cable ends and additionally to transfer cable tension forces across the splice independently of the splice conductors. The assembly includes a plurality of components designed for telescopic assembly to provide a splice enclosure of resilient non-conductive split tubes chargeable with potting compound of either the setting or non-setting type. If the latter type is employed, the splice assembly may be re-entered whenever it is desirable for servicing or the addition of branchout service lines to customers served by the cable.

6 Claims, 6 Drawing Figures

PATENTED DEC 25 1973  3,781,461

CABLE SPLICE ASSEMBLY AND METHOD

This application is a continuation-in-part of our application for United States Letters Patent, Ser. No. 76,758, filed Sept. 30, 1970 now abandoned.

This invention relates to cable splicing operations, and more particularly to mutually cooperating components and a method of utilizing the same to provide a strong mechanical and electrical connection between a plurality of aligned cable ends and a protective weatherproof encapsulating enclosure for the spliced connections capable of re-entry repeatedly for servicing operations without need for disrupting the electrical connection between the cable sheath or interfering with the tension tie between the cables.

The completion of the splice connections between the conductors of aligned cable ends is beset by many and varied problems including weatherproofing as well as the mechanical and electrical effectiveness of its components. Substantially all multi-conductor cables include a thin, electrical shielding jacket underlying its protective sheath. Formerly, metal cable sheaths were employed and these were interconnected by a metallic shroud tube embracing the spliced conductors and having its opposite ends bonded to the respective metallic sheaths. Such metallic splice enclosures were utilized not only for protective purposes but to mechanically interconnect the cables. The present-day wide scale use of non-metallic cable sheaths necessitates resort to new expedients to protect the splice and to transfer the cable tension stresses across the splice connection. Various proposals have been made for doing so but none are free from problems or as satisfactory or as adequate as is desirable.

Also splice assemblies as heretofore provided are not as readily re-entered as the present construction for the purpose of making alterations or performing service operations on the splice proper. Certain proposals to meet these objections have been made heretofore but the constructions so far proposed are bulky, complex, utilize a multiplicity of fasteners, and are not expandable to suit varying operating conditions.

The present invention avoids the foregoing and numerous other shortcomings of prior cable splice assemblies.

These objectives are achieved in major part by the provision of a plurality of components designed to be readily assembled to two or more cable ends in the field by workmen having a minimum of training, skill and expertise. The assembly includes at least one and preferably a pair of bonding assemblies for each cable end each having a pair of shoes between which the cable sheath and electrical shield are sandwiched under considerable pressure to provide a very high strength, high capacity electrical and mechanical connection with the shield and sheath. The clamping shank of each assembly protrudes from the side of the cable and is clamped to one end of a strong conductive mechanical tie bar interconnecting between two or more clamping assemblies installed on the respective ends of aligned cables. This tie bridges the splice, electrically interconnects the cable shield and serves to transfer the tesnion forces acting in the cables past the splice without imposing any stress on the spliced conductors. This tie is readily adjustable in length to accommodate any slack in the cables while leaving adequate room between the cable ends to complete the splice connections. After the cables have been mechanically and electrically connected, the splicer proceeds to complete the necessary splice connections in the usual manner and then encloses the splice in a non-conductive, light-weight, protective enclosure comprising a plurality of split, non-conductive, resilient tubes readily assembled over the splice by spreading the split tubes or by telescoping the tubes together from temporary positions on the cables to either end of the splice operation.

Desirably and after assembly, the split is bridged or closed by a flexible grooved sealing strip embracing the edges of the split tubing. The two end tubes have converging ends and the tips of these can be cut off until they fit the particular cable size. These tips are sealed against the cable by cooperating servings of tape one of which embraces the cable interiorly of the tubing and the other embracing the tubing at its junction with the cable are embraced and interconnected by one or more intermediate split tubes. The assembled enclosure is wrapped with one or more tie bands and charged with suitable potting compound as the air escapes through the splits in the tubes. Preferably, a non-setting, gel-like, waterproof compound is employed if re-entry is desirable for testing and servicing operations.

Alternatively a polymerizable potting compound may be employed in lieu of a non-setting type in cases where it is desirable to permanently and hermetically seal the splice housing closed or where the cables are gas-charged.

Charging is facilitated by suitable capable fittings held assembled between the edges of the split tubing and preferably located at spaced intervals along longer embodiments of the splice assembly. Another accessory comprises a strip of normally sealed nipples of supple elastomeric material held assembled between the edges of the split tubing. The tips of these nipples can be severed to provide sealed outlets for service branch-outs from one or more pairs of the cable conductors.

It is therefore a primary object of the present invention to provide an improved, inexpensive, highly versatile splice assembly and method of preparing the same.

Another object of the invention is the provision of a cable splice assembly utilizing a combination electrical and mechanical tie between the shielding and sheath jackets of the cable ends being spliced together and making it feasible to utilize a light-weight, low-strength non-load bearing enclosure for the splice.

Another object of the invention is the provision of a re-enterable cable splice assembly wherein the tensile load of the cables is transmitted past the splice area via the combination electrical grounding and load-transmitting tie member which, together with the splice connections, are embedded in non-setting, gel-like potting compound.

Another object of the invention is the provision of a cable splice assembly designed to be assembled about a splice after the splice connections have been completed and which includes a plurality of non-conductive resilient overlapping tubes sealed against the cable sheaths to either side of the spliced conductors.

Another object of the invention is the provision of a cable splice assembly having a splice housing provided with one or more normally sealed pliant nipples each adapted to accommodate a service branchout cable through the side wall.

These and other more specific objects will appear upon reading the following specification and claims and upon considering in connection therewith the attached drawing to which they relate.

Referring now to the drawing in which a preferred embodiment of the invention is illustrated:

Figure 1:
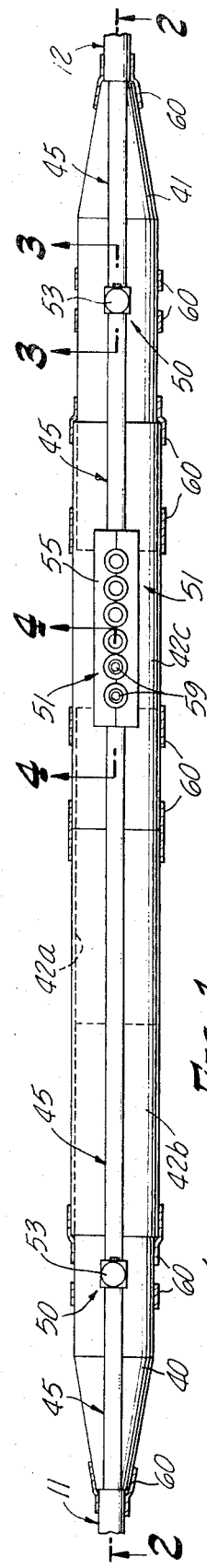
FIG. 1 is a longitudinal view of one preferred embodiment of the splice assembly fully assembled but showing the sealing bands in cross section.
Figure 5:
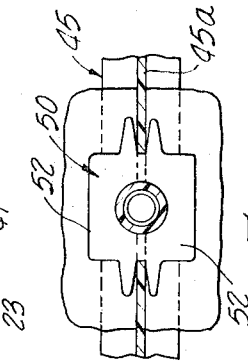
Figure 6:
Figure 3:
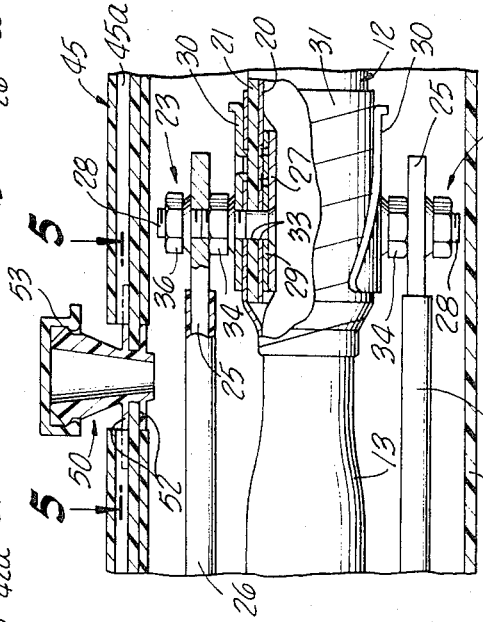
Figure 4:
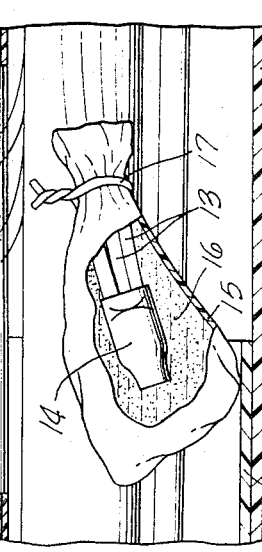

FIGS. 3 and 4 are fragmentary views on an enlarged scale taken along lines 3—3 and 4—4, respectively, on FIG. 1;

FIG. 5 is a fragmentary sectional view taken along line 5—5 on FIG. 3 showing one of the clamping shoe assemblies; and FIG. 6 is a cross sectional view taken along line 6—6 on FIG. 4.

Figure 2:
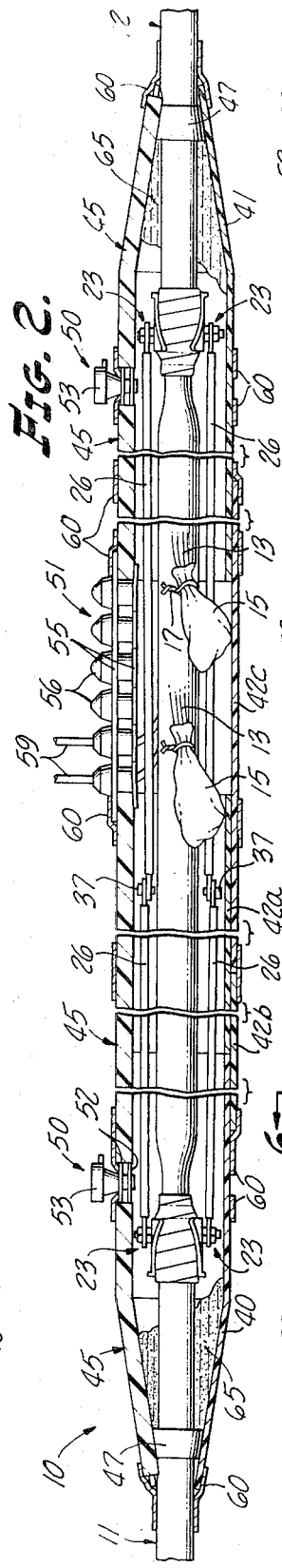
FIG. 2 is a cross sectional view on an enlarged scale taken along line 2—2 on FIG. 1.

Referring initially more particularly to FIGS. 1 to 3, there is shown an illustrative embodiment of the splice assembly, designated generally 10, enshrouding the splice connections between a pair of electrically shielded multi-conductor cables 11,12 in general alignment with one another. Each cable includes a multiplicity of individual conductors 13, the unsheathed ends of at least certain ones of which are spliced together in any well known manner within a shroud 14. Several such splices may and usually are grouped together and inserted into a small plastic bag 15 containing a non-setting gel-like potting compound 16, the bag inlet being held gathered about conductors 13 by an annealed tie 17.

Preliminary to making the splice connections, high-capacity high strength anchorages are installed on each cable end to perform important multiple functions including the transfer of tensile stresses between the cable ends completely independently of the spliced conductors and electrically connecting the shielding jackets of each cable to one another. The details of one of the anchor assemblies and its structural and functional relationship to features of cable 12 are shown in FIGS. 3. Cable 12 will be understood as comprising a bundle of flexible individually insulated conductors 13 enshrouded in a conductive metal tube 20 effective to shield the conductors against the passage of electrical flux fields. This shield usually surrounds a thin walled flexible tube of insulating material and, in turn, is encased by a very tough high-strength outer shroud or sheath 21. In the usual case, sheath 21 is formed of tough elastomeric material such as a specially compounded plastic material.

Although shield tube 20 is thin and has relatively negligible mechanical strength, it is important that an excellent electrical connection be provided between the shields of the respective cables being spliced together capable of carrying not only very minute currents but heavy charges such as those sometimes occasioned by accidents or lightning. In order to provide such a connection and at the same time transfer cable tesnion stresses between the cables being spliced, there is provided by this invention at least one and preferably a pair of clamping accessories designated generally 23 for each of the cable ends and connected to one another by a common, heavy gauge conductor or strap 25 perforated at spaced intervals therealong and normally covered by a jacket 26 of flexible insulating material.

Clamping assembly 23 is preferably of the type disclosed in our copending U.S. Pat. application Ser. No. 212,399 filed Dec. 27, 1971 and includes a transversely arched inner shoe 27 curved to conform with the curvature of the shield jacket and fixed to one end of a threaded shank 28. A flexible metal shim 29 formed with a plurality of outwardly directed sharp edged burrs is sandwiched between shoe 27 and the inner surface of shield jacket 20. An outer transversely arched wide area metal shoe 30 is assembled over the outer end of shank 28 after the cable sheath has been snugly wrapped with adhesive tape 31. Shank 28 is inserted from the inner end of a pair of aligned openings 33 through shield 20 and sheath 21, an operation which is facilitated by slitting the shield and sheath lengthwise of the cable for several inches laterally of openings 33 to permit the sheath to be expanded away from the cable conductors sufficiently to permit insertion of shank 28. After the inner shoe and shank have been assembled, the sheath is compressed against the conductors and securely anchored in this position by servings of high strength tape 31. Thereafter outer shoe 30 is inserted over the shank and secured in place by tightening a clamping nut 34.

Both cable ends are preferably equipped with a pair of clamping assemblies 23 in the manner just described and disposed diametrically opposite one another, following which the high strength straps 25 are assembled between aligned pairs of the threaded shanks 28 of clamping assemblies 23 and clamped securely in place by lock nuts 36. It will be understood that the distance between the clamping assemblies may vary widely under different operating circumstances and the series of holes along strip 25 accommodating these varying conditions assures that the cable ends can be rigidly interconnected in one of a number of positions and with assurance that the spliced conductors 13 are relaxed and completely untensioned. Additional flexibility in use is provided by forming each bar in two halves adjustably securable together at their overlapped midportions by a bolt 37. It will also be recognized that the tensile stresses are shared by the two sets of bonding bar ties disposed diametrically opposite one another without placing any of the cable conductors under compressive stress.

The splicing, bonding, and mechanical tying operations having been completed, the next step is to assemble the splice housing or enclosure thereabout. This enclosure comprises two frusto-conical end members 40,41 and one or more intermediate connector members there being first, second and third intermediate members 42a,42b,42c in the illustrative embodiment shown in FIGS. 1 to 6. All of these members are preferably semi-rigid resilient non-conductive material, such as a high strength thermoplastic material, and each is split for the full length thereof to permit their assembly over the completed splice by spreading the edges of the split members apart following which they immediately retract to their normal position with the edges of the split close to one another. Alternatively, the various split tubes can be telescoped over the respective cable ends before splicing starts and thereafter telescoped into their assembled positions from either end of the split. The frusto-conical end members 40,41 may have their smaller ends cut off in a transverse plane so selected that their collapsed diameter corresponds very closely to that of the cable sheath being embraced.

During the initial assembly operation of the housing members 40,41,42, each can be moved readily along the length of the cable. If only one intermediate split tube is needed for a short splice, the adjacent ends of end members 40,41 may abut one another generally centrally of the splice or these ends may be separated from one another axially of the assembly. In either case the single intermediate split tube embraces the adjacent ends of the two end tubes 40,41. However, if they do abut, then the central portion of the splice is enclosed by an enclosure of double wall thickness.

For longer and larger diameter splice assemblies, a splice housing of expanded length is highly desirable and this need is readily satisfied by the present invention simply by increasing the number of standard length split tubes. Such an expanded housing assembly is illustrated in FIGS. 1 and 2 using three split intermediate tubes instead of one as described in the preceding paragraph. Thus it will be understood that split tubes 42a,42b,42c are preferably of the same length as when utilizing a single one thereof to bridge and interconnect the two tapering end tubes 40 and 41. Owing to the resiliency and split running lengthwise of each section the first tube section 42a is readily held assembled to tapering end tube 40 by the second tube section 42b, the former being held in end to end abutment with the larger end of tube 40 by the telescopic bridging action of tube 42b. Likewise the third tube section 42c has one end telescoped over the adjacent end of tube 42b and its other end telescoped over the larger end of tapering tube 41.

The splits extending lengthwise of the tubes are preferably closed by a flexible plastic sealing strip 45 of generally H-shape in cross section as appears from FIG. 6. These tough resilient strips are formed with deep grooves along their lateral edges sized to grip and seat the slit edges of the tube walls snugly with the cross bar 45a (FIG. 5) of strip 45 seated in contact with a respective edge of this slit. The grooves of strip 45 are sufficiently wide and resilient to accommodate either a single or a double wall thickness of the split tubes with the outer free lips of the strip seating resiliently against the inner and outer surfaces of either a single tube or the similar surfaces of two of the tubes telescoped together.

Before telescoping the split tubes together a thick collar 47 of Buna sealing tape, or the like, is tightly wrapped about the exterior of cables 11, 12 in the positions best shown in FIG. 2 each sized to form an effective seal between the cable and the interior of the smaller ends of tapering tubes 40,41.

Prior to telescoping the splice housing tubes together, charging fittings 50 and nipples 51 for service branchout cables are installed between the edges of the splits in the tube sections. Charging fittings 50 comprise molded plastic flaring tubes the smaller ends of which have radial flanges 52,52 cooperating to form grooves along the sides thereof to seat the edges of the splits in the tubes. Hence these flanges straddle the split and serve to anchor the charging fitting anchored to the splice housing in the same manner as sealing strips 45. A removable cap 53 seats over the larger outer end of each of the fittings and closes the fittings except when charging the housing with sealing compound.

Nipples 51 are likewise molded of supple thermoplastic material and include any suitable number of similar nipples sealed at their outer ends as made and formed with integral pairs of flanges 55 at their bases sized and shaped to seat over the lateral edge portion of the split along the intermediate tube sections to preclude the entry of moisture or the escape of potting compound. The tips 56 of one or more of the nipples may be cut off to provide a perforation or opening 57 having a snug resilient fit with the exterior surface of one or more service branchout cables 59. These cables are spliced to appropriate conductors of the main cable and extend to the premises of a customer served by the cable.

The splice housing components having been telescoped together as described above, the operator applies servings or ringlets 60 of high strength adhesive tape about the tubes at spaced points therealong exercising care to hold the tubes snugly contracted against one another and against the opposite edges of sealing strips 45. These ringlets serve to hold the parts securely assembled and in sealing contact and avoid the possibility of blow out of potting compound during the subsequent potting operation.

Charging the entire interior of the enclosure with potting compound 65 is usually carried out through charging fittings 50. A preferred potting compound comprises a permanent, non-setting, water repellant gel now commercially available on the market. This compound may be charged using a grease-gun type dispenser having a nozzle inserted into the charging fittings 50. As the gel is forced into the interior of the enclosure, air is forced to escape through the slits frictionally closed with the sealing strips 45. More than one charging fitting is normally used and much of the air escapes through these ports. As the housing or enclosure reaches a fully charged condition, the gel pressure increases so that traces of it begin to seep through the joints. After the operator observes that the enclosure is fully charged, caps 53 are snapped over the outer flanged ends of fitting 50. When charged with gel-type compound, the assembly can be easily re-entered at any time and re-sealed in the same manner described above.

If a permanent splice enclosure is desired, it is charged with a setting potting compound such as with any of the commercially available polymerizable potting compounds. Such compounds form an excellent bonding or hermetic seal with the surfaces of the conductors and the interior surfaces of the enclosure.

While the particular cable splice assembly and method herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. A cable splice assembly for encapsulating splice connections between a plurality of aligned overlapping cable ends and at least one branchout service cable, said assembly comprising a plurality of resilient split tubes of rigid plastic material and including at least one intermediate tube and a pair of end tubes tapering toward their remote ends and adapted to embrace the sheath of a respective one of the cables snugly, said tubes being aligned with one another and having their adjacent ends telescoped together to provide an enclosure bridging the conductor splices the edges of said split tubes being seated in the grooved lateral edges of sealing strips extending lengthwise thereof, means for holding the edges of said split tubes seated in said sealing strips and restraining said split tubes against expanding out of assembled relation with said sealing strips, at least one molded resilient nipple means having a pair of parallel grooves facing away from one another along the opposite sides thereof and sized to seat the juxtaposed edges of the slit along one of said tubes and adapted to be perforated centrally of its closed end to seal about and have a snug fit with the exterior of a branchout service cable, and the interior of said splice assembly being chargeable via the slit in one of said tubes with a charge of potting compound filling the interior of said splice assembly to seal the same against the entry of air and moisture.

2. A cable splice assembly as defined in claim 1 characterized in the provision of a plurality of molded pliant nipple means each grooved along the opposite lateral sides of one end thereof and seating a respective edge of one of said split tubes to hold said nipple means captive in said slit, the other ends of said nipples being closed but severably to snugly seat a separate branchout service cable extending outwardly therethrough from the interior of said splice assembly.

3. A cable splice assembly as defined in claim 1 characterized in that said potting compound has a permanent gel-like consistency whereby said assembly can be readily opened for servicing and reclosed and recharged with said gel-like potting compound at any time.

4. A cable splice assembly as defined in claim 1 characterized in that said potting compound is of a type which takes a firm set and bonds itself to surfaces in contact therewith thereby bonding the parts of said splice assembly permanently together in a hermetically sealed assembly.

5. A cable splice assembly as defined in claim 1 characterized in the provision of potting compound charging means, said charging means comprising a molded tubular fitting having deep grooves along opposed portions thereof which grooves are sized to seat opposed edges of the slit along said slit tubes, and a closure cap detachably secured to the outer end of said charging means.

6. A cable splice assembly as defined in claim 1 characterized in that said split tubes include first, second and third intermediate tubes axially aligned with one another, said first intermediate tube abutting the larger end of one of said tapering tubes and held assembled thereto by said second aplit tube snugly embracing the abutting portions of said one tapering tube and said first tube, and said third tube being telescoped in part over the large end of the other one of said tapering tubes and the adjacent end portion of said first split tube, and ringlet means snugly embracing said first, second and third split tubes and holding the same snugly contracted together and to said tapering split tubes.

* * * * *